United States Patent

Heitmann

[11] Patent Number: 4,648,412
[45] Date of Patent: Mar. 10, 1987

[54] APPARATUS FOR PERFORATING WRAPPING MATERIAL FOR ROD-SHAPED ARTICLES OF THE TOBACCO PROCESSING INDUSTRY

[75] Inventor: Uwe Heitmann, Hamburg, Fed. Rep. of Germany

[73] Assignee: Hauni-Werke Körber & Co. KG., Hamburg, Fed. Rep. of Germany

[21] Appl. No.: 724,198

[22] Filed: Apr. 17, 1985

[30] Foreign Application Priority Data

Apr. 18, 1984 [DE] Fed. Rep. of Germany ....... 3414645

[51] Int. Cl.$^4$ .......................... A24C 5/20; A24D 3/02
[52] U.S. Cl. ................................................... 131/281
[58] Field of Search ......................................... 131/281

[56] References Cited

U.S. PATENT DOCUMENTS

4,090,826 5/1978 Hinzmann .
4,121,595 10/1978 Heitmann et al. .
4,240,448 12/1980 Heitmann et al. .
4,249,545 2/1981 Gretz et al. .
4,281,670 8/1981 Heitmann et al. .

Primary Examiner—Vincent Millin
Assistant Examiner—H. Macey
Attorney, Agent, or Firm—Peter K. Kontler

[57] ABSTRACT

Apparatus for perforating the wrappers of filter cigarettes or a continuous web of wrapping material for filter cigarettes has a continuous-wave laser and one or more rotary disc-shaped shutters extending across the path of propagation of the laser beam toward the wrappers or web of wrapping material. The dimensions of perforations in the wrappers or web of wrapping material can be regulated by changing the position of the shutter or shutters relative to the laser beam and/or relative to each other.

27 Claims, 7 Drawing Figures

APPARATUS FOR PERFORATING WRAPPING MATERIAL FOR ROD-SHAPED ARTICLES OF THE TOBACCO PROCESSING INDUSTRY

BACKGROUND OF THE INVENTION

The present invention relates to apparatus for making perforations in web- or sheet-like materials, and more particularly to improvements in apparatus for making perforations in wrapping materials for rod-shaped articles of the tobacco processing industry. Still more particularly, the invention relates to improvements in apparatus for making perforations in wrapping materials for tobacco and/or filter material by means of one or more beams of coherent radiation. The wrapping material which is to be perforated in the apparatus of the present invention can be used to confine natural, substitute or reconstituted tobacco, filter material and/or tobacco as well as filter material.

The making of air-permeable ventilation zones in the wrappers of filter cigarettes and other types of rod-shaped smokers' products is known for many years. For example, commonly owned U.S. Pat. No. 4,090,826 to Hinzmann discloses an apparatus which utilizes pointed tools serving to pierce the wrappers of filter plugs of filter cigarettes so as to form therein ventilation zones which permit atmospheric air to penetrate into the column of tobacco smoke and to thus exert a beneficial influence upon the percentage of nicotine and condensate in the smoke which reaches the smoker's mouth. The perforations in a filter cigarette are or can be made in the wrapper of the filter mouthpiece close to the locus of attachment of the mouthpiece to the tobacco-containing portion of the article. It is desirable to ensure that the permeability of the ventilating zone match or very closely approximate a preselected value and that the selected permeability remain constant for any desired periods of time. In other words, the ratio of fresh air to other constituents of the column of tobacco smoke flowing toward the mouth of the smoker should remain unchanged from article to article in spite of the extremely high speed at which such articles are being turned out by a modern filter rod making machine, cigarette maker or filter tipping machine.

The apparatus which is disclosed in the aforementioned patent to Hinzmann exhibits the drawback that the mechanical piercing tools are subject to extensive wear so that their positions relative to the advancing wrapping material must be changed at rather frequent intervals. Furthermore, it is necessary to replace a set of piercing tools with a set of fresh tools as soon as mere adjustment of the positions of partially spent or dulled piercing tools does not sufficient to ensure the making of holes having a predetermined diameter. This entails relatively long interruptions of production which, in turn, results in substantial losses in output since a modern filter tipping machine, cigarette maker or filter rod making machine can turn out many thousands of articles per minute. Moreover, the means for adjusting the positions of piercing tools relative to the path of movement of wrapping material and for causing penetration of such tools into the wrapping material whenever the tools are to form a ventilation zone is rather complex, bulky and expensive.

It is also known to utilize sets of electrodes which cause partial combustion of wrapping material to thus generate holes of desired size and/or shape. Still further, it is already known to employ perforating apparatus which comprise one or more sources of coherent radiation. One or more beams of such radiation are directed against the wrapping material so that the beam or beams combust the material and make holes which allow fresh air to penetrate into the column of tobacco smoke. Reference may be had to U.S. Pat. No. 4,240,448 to Heitmann; to U.S.Pat. No. 4,121,595 to Heitmann; to U.S. Pat. No. 4,193,409 to Wahle et al.; to U.S. Pat. No. 4,281,670 to Heitmann et al.; and to U.S. Pat. No. 4,249,545 to Gretz et al. The just enumerated patents disclose lasers which are energized at intervals so as to ensure that the beams of coherent radiation will make discrete hole instead of burning away entire strips of wrapping material.

OBJECTS AND SUMMARY OF THE INVENTION

An object of the invention is to provide a novel and improved apparatus which can be used to provide the wrapping material of plain or filter cigarettes or other rod-shaped articles of the tobacco processing industry with perforations of desired size so as to ensure that the column of tobacco smoke flowing through the article to the smoker's mouth will contain a predetermined percentage of fresh air.

Another object of the invention is to provide a relatively simple but highly versatile perforating apparatus which can be installed in cigarette making, filter tipping, filter rod making or analogous machines to make perforations in webs of wrapping material prior or subsequent to convolution of such material around rod-shaped filters.

A further object of the invention is to provide novel and improved means for altering the size of holes in the perforated regions of the wrapping material.

An additional object of the invention is to provide an apparatus whose perforating action can be regulated within a desired range while the machine embodying the apparatus is at a standstill as well as while the machine is in actual use.

Still another object of the invention is to provide an apparatus which occupies little room in a filter rod making, cigarette making or filter tipping machine, whose adjustment can be effected automatically in order to conform its operation to the nature of smokers' articles whose wrappers are to be provided with holes, and which can be used as a superior substitute for heretofore known perforating apparatus.

An additional object of the invention is to provide a novel and improved perforating apparatus of the type wherein the making of holes is effected by one or more beams of coherent radiation.

A further object of the invention is to provide a novel and improved method of providing wrapping materials for cigarettes or the like with holes by means of one or more beams of coherent radiation.

Another object of the invention is to provide a novel and improved machine which embodies the above outlined perforating apparatus.

The invention resides in the provision of an apparatus for perforating the wrapping material for rod-shaped articles of the tobacco processing industry so as to provide the wrapping material with zones of selected air permeability. The apparatus comprises a source of coherent radiation (preferably including a laser and most preferably a continuous-wave laser) which is arranged to direct at least one beam of such radiation along a predetermined path, means for moving the wrapping material along a second path which intersects the predetermined path, and means for intermittently obstructing impingement of the beam or beams upon the wrapping material so that the wrapping material in the second path is subjected to intermittent perforating action of one or more beams of coherent radiation. The apparatus preferably further comprises means for adjusting the obstructing means so as to alter the intervals of impingement of coherent radiation upon the wrapping material.

The obstructing means can have at least one opening whose effect size determines the duration of impingement of coherent radiation upon the wrapping material. The effective size is that size or portion of the opening through which the beam or beams pass along the predetermined path from the source toward the wrapping material in the second path. The effective size of such opening is variable by the adjusting means.

In accordance with one presently perferred embodiment of the invention, the obstructing means comprises one mobile (particularly rotary) shutter. The shutter can constitute a disc which has a plurality of openings, and such openings can be provided in the periphery of the disc. The adjusting means can comprise means for moving the disc-shaped shutter linearly substantially at right angles to the axis of rotation of the shutter, and the openings are then configured in such a way that their effective size in the region where they permit coherent radiation to pass therethrough varies in response to linear adjustment of the shutter. The openings of such shutter can have a triangular, trapezoid or an analogous shape.

In accordance with another presently preferred embodiment of the invention, the obstructing means comprises a plurality of coaxial substantially disc-shaped shutters and means for rotating the shutters. Each of such plurality of shutters has at least one opening and the adjusting means is preferably arranged to change the extent to which the openings of the shutters register with each other (i.e., the extent to which one of the shutters obstructs the opening of the other shutter and/or vice versa). Each of the shutters is preferably provided with a plurality of openings and the shutters are or can be identical insofar as their obstructing action is concerned, i.e., their openings can be brought to positions of exact register with one another. The adjusting means which is used in an apparatus employing several shutters (normally two coaxial shutters) comprises means for changing the angular positions of the shutters relative to each other. Such adjusting means can comprise a differential gearing.

In accordance with a further embodiment of the invention, the obstructing means comprises at least one rotary shutter and adjustable drive means for rotating the shutter. Such drive means can comprise a stepping motor and the apparatus can further comprise means for adjusting the stepping motor as a function of the speed of movement of the wrapping material under the action of the moving means. The latter can comprise means for moving a continuous web of wrapping material along the second path or a means for rotating a succession of tubular bodies of wrapping material about their respective axes while such bodies are acted upon by coherent radiation. The tubular bodies can constitute the wrappers of plain cigarettes, filter cigarettes, filter rod sections or analogous rod-shaped articles of the tobacco processing industry.

The adjusting means can comprise at least one manually operated adjusting element, e.g., a screw which can change the position or orientation of the obstructing means. Alternatively, the adjusting means can comprise a motor, preferably an adjustable motor. The apparatus then further comprises means for adjusting the motor and such adjusting means can comprise means for monitoring the permeability of the wrapping material and means for adjusting the motor when the permeability of the wrapping material deviates from a predetermined value.

If the obstructing means comprises at least one rotary shutter, the adjusting means can include means for rotating the shutter at a variable first angular velocity while the shutter permits coherent radiation to reach the wrapping material and at a preferably variable different second angular velocity during those intervals when the shutter obstructs the propagation of the beam or beams of coherent radiation toward and into actual contact with the wrapping material in the second path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
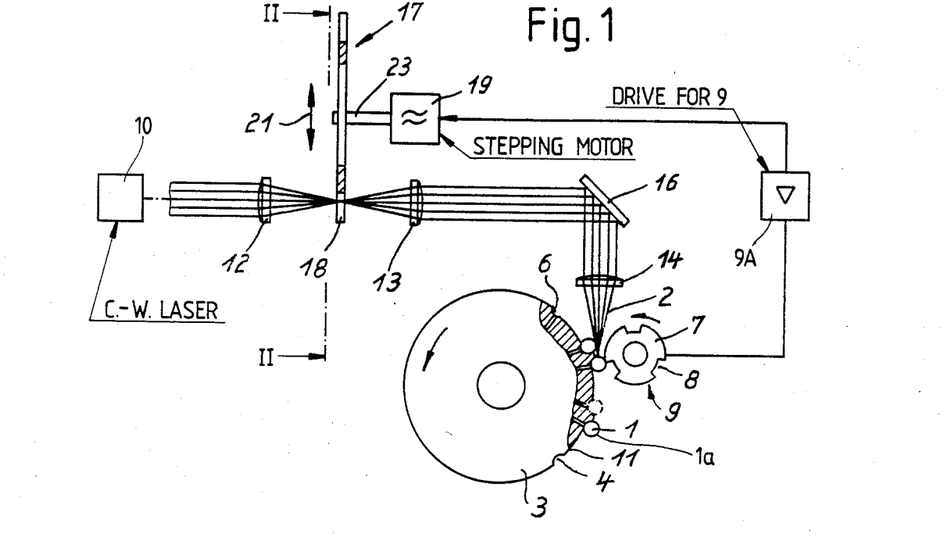
FIG. 1 is a schematic partly elevational and partly sectional view of an apparatus which embodies one form of the invention and wherein a beam of coherent radiation is used to make perforations in successive tubular bodies of wrapping material.

FIG. 1 shows an apparatus which is designed to make perforations in tubular bodies 1a consisting of cigarette paper, tipping paper or other suitable wrapping material and constituting the wrappers of rod-shaped smokers' articles 1. For example, the articles 1 can constitute filter cigarettes of unit length or multiple unit length which are produced in a filter tipping machine (e.g., a machine known as MAX or MAX S, both manufactured and distributed by the assignee of the present application). The perforating action is carried out by a beam 2 of coherent radiation which issues from a continuous-wave laser 10 and is caused to pass through lenses 12, 13, a totally reflecting mirror 16 and a further lens 14.

The means for moving successive tubular bodies 1a along a path which intersects the path of propagation of the beam 2 is similar to or identical with the moving means disclosed in the aforementioned U.S. Pat. No. 4,249,545 to Gretz et al. Thus, the moving means comprises a rotary drum-shaped conveyor 3 having axially parallel peripheral article-receiving flutes 4 which communicate with suction ports 6. The suction ports 6 are connected to a suction generating device (e.g., to the intake of a fan) during certain stages of revolution of the corresponding portions of the conveyor 3 so as to tend to attract the articles 1 to the surfaces surrounding the respective flutes 3. The path which is defined by the flutes 4 of the conveyor 3 intersects the path which is defined by the mirror 16 and lens 14 for the propagation of the laser beam 2. The conveyor 3 cooperates with a rotary drum-shaped rolling device 9 having axially parallel peripheral protuberances 7 alternating with axially parallel peripheral recesses 8. The conveyor 3 and the rolling device 9 are rotated in the same direction (counterclockwise, as viewed in FIG. 1), and the minimum distance between a protuberance 7 and the nearest portion of an article 1 in its flute 4 equals or is slightly less than the diameter of an article. This ensures that each article 1 whose tubular body 1a is in the process of being perforated by the beam 2 completes a full revolution about its own axis which, in turn, guarantees that the tubular body 1a is formed with an annulus of preferably or substantially equidistant holes together constituting a ventilating zone, preferably in the region of the inner end portion of the filter mouthpiece of the respective article 1. Reference may be had to FIG. 4 of U.S. Pat. No. 4,193,409 to Wahle et al. The arrangement is such that, when an oncoming article 1 is engaged by an oncoming protuberance 7 of the rolling device 9, such article is expelled from its flute 4 and is caused to roll about its own axis while simultaneously rolling along the adjacent convex portion 11 of the peripheral surface of the drum-shaped conveyor 3. The rolling operation is completed when the article 1 enters the unoccupied neighboring flute 4 of the conveyor 3.

Figures 2, 5:
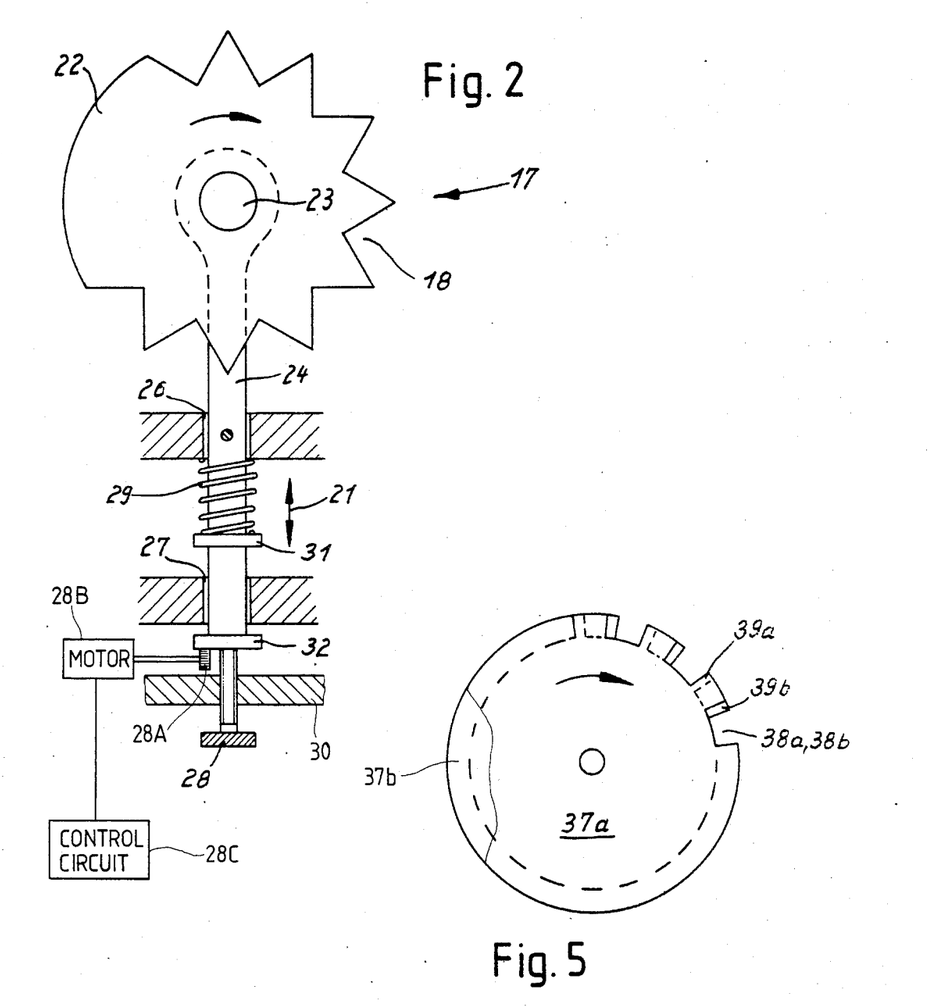
FIG. 2 is an enlarged view as seen in the direction of arrows from the line II—II in FIG. 1 and shows manually operated means for adjusting the obstructing means which consists of a single rotary disc-shaped shutter.
FIG. 5 is a smaller-scale front elevational view of the shutters as seen in the direction of arrows from the line V—V of FIG. 4.

In accordance with a feature of the invention, the impingement of the continuous-wave laser beam 2 upon the tubular wrapping material body 1a of the article 1 which rotates between one of the convex surface portions 11 and the adjacent protuberance 7 is prevented at predetermined intervals by an obstructing device including a disc-shaped shutter 17 the configuration of which is shown in FIG. 2. The peripheral portion of the shutter 17 is formed with a plurality of triangular openings 18 whose width increases in a direction radially of and away from the axis of the shaft 23 which forms part of the means for rotating the shutter 17 in the space between the lenses 12, 13 and in a plane which is or which can be at least substantially normal to the corresponding portion of the path of propagation of the laser beam 2 from the source 10 toward the space between the conveyor 3 and rolling device 9. The means for rotating (indexing) the shutter 17 further comprises a stepping motor 19 which transmits torque to the shaft 23. The latter can constitute a flexible shaft or the stepping motor 19 is mounted for movement with the shutter 17 in directions indicated by a double-headed arrow 21. The operation of the stepping motor 19 is synchronized with the operation of the means 9A for rotating the rolling device 9 so that the continuous-wave laser beam 2 acts upon the tubular bodies 1a in a pulsating fashion, i.e., intervals of impingement of the beam 2 upon a tubular body 1 alternate with pauses so that the tubular body 1a is formed with a series of discrete holes in the form of circular apertures or elongated slots rather than with a continuous slot extending circumferentially of the adjacent portion of the filler of the corresponding rod-shaped smokers' article 1. The duration of pulses of the beam 2 in the region between the conveyor 3 and rolling device 9 is determined by the effective size of those portions of the triangular openings 18 of the disc-shaped shutter 17 through which the beam 2 passes, i.e., by the distance between the axis of the shaft 23 and that portion of the path of propagation of the beam 2 which extends between the lenses 12 and 13.

The shutter 17 is linearly adjustable in the directions indicated by the double-headed arrow 21 for the purpose of enhancing the versatility of the improved perforating apparatus. For example, and since the inherent or initial permeability of different kinds of wrapping material for the fillers of rod-shaped smokers' articles is not the same, it is necessary to change the size of the holes in the tubular bodies 1a when the filter rod making machine which turns out such articles starts to receive a different type of wrapping material. A filter tipping machine which can utilize the apparatus of FIGS. 1 and 2 is disclosed, for example, in FIG. 1 of the aforementioned U.S. Pat. No. 4,281,670 to Heitmann et al. Furthermore, it is often desirable to change the size of the holes which are formed by the laser beam 2 when the filter tipping machine is converted for the making of a different brand of cigarettes containing a different blend of tobaccos and requiring the admission of a different quantity of atmospheric air into the column of tobacco smoke. Still further, it is necessary or advisable to adjust the position of the shutter 17 relative to the adjacent portion of the path of propagation of the laser beam 2 when the rate of admission of atmospheric air into the column of tobacco smoke deviates from a desired rate, e.g., because the density of the filter material or tobacco within the confines of the perforated portion of the respective tubular body 1a deviates from an anticipated average or optimum density.

As can be readily seen, the configuration of the (triangular) openings 18 in the periphery of the disc-shaped shutter 17 is such that their effective size varies when the shutter 17 is adjusted linearly in the directions indicated by the double-headed arrow 21. Thus, and referring to FIG. 1, the effective size of the openings 18 will increase if the shutter 17 is raised (because the width of the openings 18 increases in a direction toward the periphery of the shutter), and the effective size of the openings 18 will decrease if the shutter 17 is lowered so as to move the shaft 23 nearer to the adjacent portion of the path of propagation of the beam 2 between the lenses 12 and 13. In other words, the length of intervals of impingement of the beam 2 upon the tubular body 1a of an article 1 between the conveyor 3 and the rolling device 9 increases if the shutter 17 is raised, as viewed in FIG. 1, and the length of such intervals is reduced if the shutter 17 is lowered.

The facets bounding the triangular openings 18 in the shutter 17 may but need not be flat. For example, such facets can have a concave, convex, undulate or other shape without departing from the spirit of the invention. The exactly triangular configuration of the holes 18 is preferred at this time because it allows for a simple and highly accurate regulation of the effective size of such openings.

As can be seen in FIG. 2, the shutter 17 includes an arcuate portion 22 which is not formed with any openings 18; this portion interrupts the beam 2 during the interval of advancement of a fresh (unperforated) tubular body 1a into the space between the conveyor 3 and the oncoming protuberance 7 of the rolling device 9. The number of openings 18 can be reduced to less than nine or increased to ten or more.

The means for adjusting the shutter 17 comprises a rod 24 which has an eyelet surrounding the adjacent portion of the shaft 23 and which extends through the registering apertures of two stationary guide members 26, 27 in the frame of the filter tipping machine. A coil spring 29 reacts against the guide member 26 and bears against a collar 31 on the rod 24 to urge the shaft 23 downwardly, as viewed in FIG. 2, whereby a second collar 32 of the rod 24 bears against the tip of a screw 28 constituting a manually operated adjusting element for the shutter 17. The screw 28 meshes with a stationary plate-like member 30 of the filter tipping machine. The shaft 23 is preferably rigid so that the stepping motor 19 for the shutter 17 participates in the movements of the rod 24 in the directions indicated by the double-headed arrow 21.

It is clear that the screw 28 can be replaced with a motor or that the screw 28 can be used in addition to a motor. For example, and as shown schematically in FIG. 2, the collar 32 of the rod 24 can be shifted by the lobe of a disc cam 28A on the output element of a suitable motor 28B which receives start and stop signals from a control circuit 28C in dependency on the initial permeability of the material of the tubular bodies 1a and/or in dependency on deviations of monitored permeability of the perforated portions of the tubular bodies 1a from an optimum permeability.

The triangular openings 18 can be replaced with trapezoid openings (for example, with openings similar to those shown at 38a and 38b in FIG. 5) or with otherwise configurated openings, as long as linear movements of the shutter 17 entail appropriate changes in the effective size of its openings.

Figure 3:
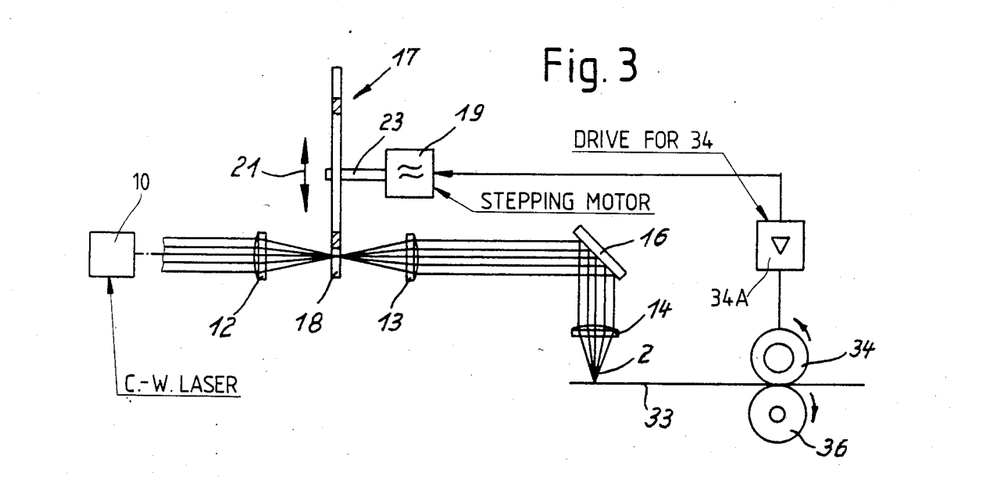
FIG. 3 is a schematic partly elevational and partly sectional view of a second apparatus wherein the beam of coherent radiation is used to make perforations in a continuous web of wrapping material.

The apparatus which is shown in FIG. 3 deviates from the apparatus of FIG. 1 in that the laser beam 2 is arranged to make perforations in spaced-apart portions of a continuous web 33 of wrapping material which is thereupon converted into tubular bodies surrounding fillers of tobacco and/or filter material in a cigarette making, filter rod making or filter tipping machine. A cigarette making machine which can embody such apparatus is disclosed, for example, in FIG. 7 of the aforementioned U.S. Pat. No. 4,121,595 to Heitmann to al. Filter rod making machines which can employ the apparatus of FIG. 3 are disclosed, for example, in commonly owned U.S. Pat. No. 4,132,189 to Greve et al.

The means for moving the web 33 of wrapping material along an elongated path which intersects the path of propagation of the intermittently obstructed laser beam 2 includes a pair of advancing rolls 34, 36. The roll 34 is driven by a prime 34A corresponding to the prime mover 9A of FIG. 1 and serving to transmit synchronizing impulses to the stepping motor 19 for the disc-shaped shutter 17. The roll 36 is biased toward the roll 34 so that the web portion in the nip of the rolls 34, 36 is compelled to advance in a direction to the right, as viewed in FIG. 3, when the motor 34A is started to rotate the roll 34 in a counterclockwise direction.

Figure 4:
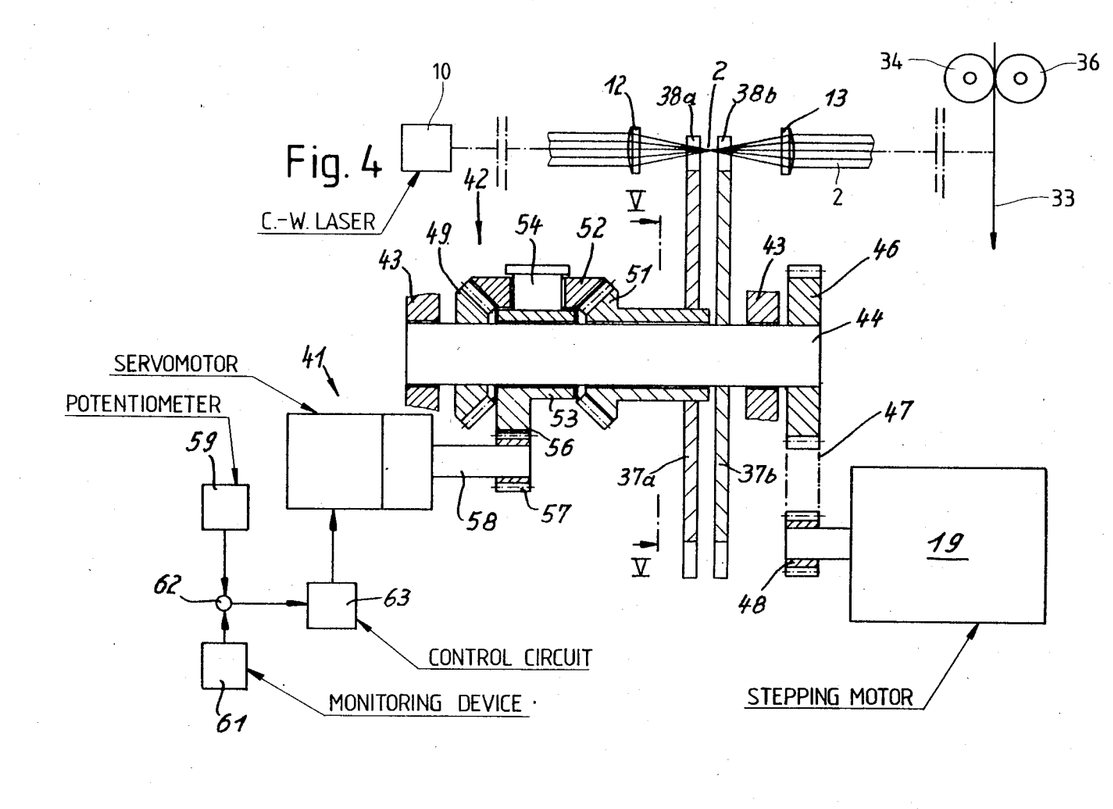
FIG. 4 is a somewhat schematic partly elevational and partly sectional view of a third apparatus wherein the obstructing means comprises two coaxial disc-shaped shutters and the adjusting means includes a differential gearing.

FIGS. 4 and 5 illustrate a third perforating apparatus wherein the means for intermittently obstructing the propagation of the laser beam 2 from the source 10 toward the path of wrapping material (in the form of discrete tubular bodies or in the form of a continuous web 33) comprises a plurality of coaxial disc-shaped shutters. The apparatus of FIGS. 4 and 4 comprises two identical shutters 37a and 37b which can obstruct the propagation of the beam 2 between the optical elements 12 and 13 of the system for directing the beam 2 toward and for focusing the beam upon the wrapping material 33. The means for adjusting the obstructing means includes a differential gearing 42 which is designed to change the angular position of one of the shutters 37a, 37b relative to the other shutter and to thereby change the effective size of the substantially trapezoid openings 38a, 38b in the peripheral portions of the respective shutters. The effective size of the openings 38a, 38b reaches a maximum value when each openings 38a of the shutter 37a is in exact register with one of the openings 38b in the shutter 37b. An advantage of the apparatus of FIGS. 4 and 5 is that the position of the common axis of the shutters 37a, 37b relative to the adjacent portion of the path of propagation of the laser beam 2 can remain unchanged. Such axis is parallel to the adjacent portion of the path of propagation of the laser beam. When the operator or an automatic motor changes the angular position of one of the shutters 37a, 37b relative to the other shutter, the extent to which the neighboring openings 38a, 38b register with one another is altered by the teeth 39a, 39b which alternate with the openings 38a, 38b, respectively.

The input element of the differential gearing 42 receives motion from a reversible servomotor 41. The means for intermittently rotating or indexing the shutters 37a, 37b about their common axis so as to move successive pairs of fully or partially registering openings 38a, 38b into positions in which they permit the laser beam 2 to pass therethrough again comprises a stepping motor 19 whose output shaft drives a toothed pulley 48 mating with a toothed belt 47 which drives a toothed pulley 46 on a shaft 44 which defines the common axis of the shutters 37a and 37b. The shaft 44 is journalled in two frame members 43 and is rigidly connected with the shutter 38b. The differential gearing 42 establishes an operative connection between the shutters 37a and 37b, i.e., it causes the shutter 37a to normally share all angular movements of the shutter 37b and shaft 44.

The differential gearing 42 comprises a first bevel gear 49 which is affixed to and rotates with the shaft 44, a second bevel gear 51 which is rotatably mounted on the shaft 44 and is spaced apart from the bevel gear 49, and a third bevel gear 52 which mates with the bevel gears 49 and 51. The shutter 37a is rigid with the hub of the bevel gear 51 which latter is identical with the bevel gear 49 so that, when the bevel gear 52 is rotated only by the bevel gear 49, the shutters 37a, 37b are caused to rotate at the same speed, but in the contrary direction. The bevel gear 52 is rotatable about the axis of a stub shaft 54 which extends radially on the shaft 44 and is mounted on a bearing sleeve 53 which surrounds the shaft 44 between the annuli of teeth of the bevel gears 49 and 51. The bearing sleeve 53 has a gear segment 56 in mesh with a pinion 57 on the output element 58 of the servomotor 41. The latter is a reversible electric motor receiving signals from a control circuit 63 (e.g., an amplifier) which, in turn, receives signals from a signal comparing stage 62. One input of the stage 62 is connected to the output of a source 59 of reference signals (e.g., an adjustable potentiometer) and the other input of the stage 62 is connected with a signal transmitting device 61 which can constitute a means for monitoring the permeability of the tubular bodies surrounding the fillers of filter cigarettes, plan cigarettes or filter rod sections. For example, the signal transmitting device 61 can monitor the permeability of the tubular wrappers of rod-shaped articles of the tobacco processing industry in a manner as disclosed in the aforementioned commonly owned U.S. Pat. No. 4,193,409 to Wahle et al. The control circuit 63 for the servomotor 41 receives from the output of the signal comparing stage 62 a signal whenever the difference between the intensity or another characteristic of the reference signal from the source 59 and the same characteristic of the signal from the signal transmitting device 61 exceeds a predetermined threshold value. This causes the servomotor 41 to effect a certain angular displacement of the intermittently indexed disc-shaped shutter 37a relative to the intermittently indexed disc-shaped shutter 37b. Thus, the pinion 58 then changes the angular position of the bearing sleeve 53 relative to the shaft 44 whereby the bevel gear 52 rolls along the bevel gear 49 which is affixed to the shaft 44 for the shutter 37b and changes the angular position of the bevel gear 51 and shutter 37a relative to the shaft 44 and shutter 37b. It will be seen that the servomotor 41 is designed to rotate the bevel gear 52 relative to the bevel gear 49; such angular adjustment of the bevel grear 52 relative to the bevel gear 49 can take place when the machine in which the apparatus of FIGS. 4 and 5 is installed is at a standstill or in actual use.

The differential gearing 42 can be replaced with manually operated adjusting means for changing the angular position of the shutter 37b relative to the shutter 37a and/or vice versa. Furthermore, the screw 28 and/or the motor 28B and cam 28A of FIG. 2 can be replaced with the differential gearing 42 and servomotor 41 of FIG. 4. Also, the rod 24 of the adjusting means shown in FIG. 2 can receive motion from the servomotor 41, either directly or through a motion transmitting unit other than the differential gearing 42 of FIG. 4.

Figure 6:
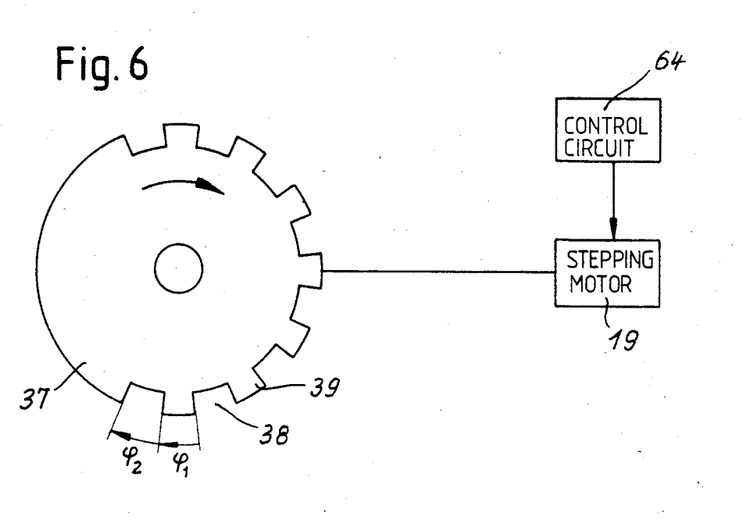
FIG. 6 illustrates a portion of a further apparatus which employs a disc-shaped shutter and modified adjusting means.

FIG. 6 shows a portion of a further perforating apparatus wherein the disc-shaped shutter 37 of the means for obstructing the propagation of a laser beam (not shown) into contact with discrete tubular bodies of wrapping material or with a continuous web of wrapping material is indexed by a stepping motor 19 receiving "start" and "stop" signals from a control circuit 64 which is designed to drive the stepping motor 19 at several different speeds, namely at a first variable angular velocity $\phi_1$ when a tooth 39 of the shutter 37 moves across the path of propagation of the laser beam and at a second angular velocity $\phi_2$ when an opening 38 permits the passage of the laser beam therethrough, i.e., when the beam is in the process of making a perforation in the wrapping material. The motor 19 is arranged to cause the shutter 37 to complete a full revolution in a predetermined number of steps. The exact design of the control circuit 64 forms no part of the invention. The dimensions of holes which are formed in the wrapping material can be altered by changing the angular velocity $\phi_1$ and/or $\phi_2$. Thus, if the angular velocity $\phi_2$ is increased or reduced, the laser beam is caused to make smaller or larger holes in the wrapping material surrounding a rod-shaped smokers' article or in a continuous web of wrapping material. The spacing between the holes in the wrapping material can be changed by increasing or reducing the angular velocity $\phi_1$.

An important advantage of the improved apparatus is that the holes in the wrapping material can be made with a continuous-wave laser and that the perforating action can be regulated in a simple and inexpensive way, by utilizing relatively simple and reliable obstructing means and adjusting means therefor, and also that the perforating action can be regulated within any desired practical range, either by hand or in a fully automatic way. Moreover, the perforating action can be adjusted while the apparatus is at a standstill or while the apparatus is in actual use. Still further, the apparatus can be used for the making of holes in a continuous web of wrapping material or in discrete (e.g., tubular) portions of such material. In addition, the apparatus can be installed in existing filter rod making, cigarette making, filter tipping or like machines as a superior substitute for heretofore known perforating apparatus, and the operation of the improved apparatus can be regulated or adjusted by monitoring means which are customary in such machines.

Figure 7:
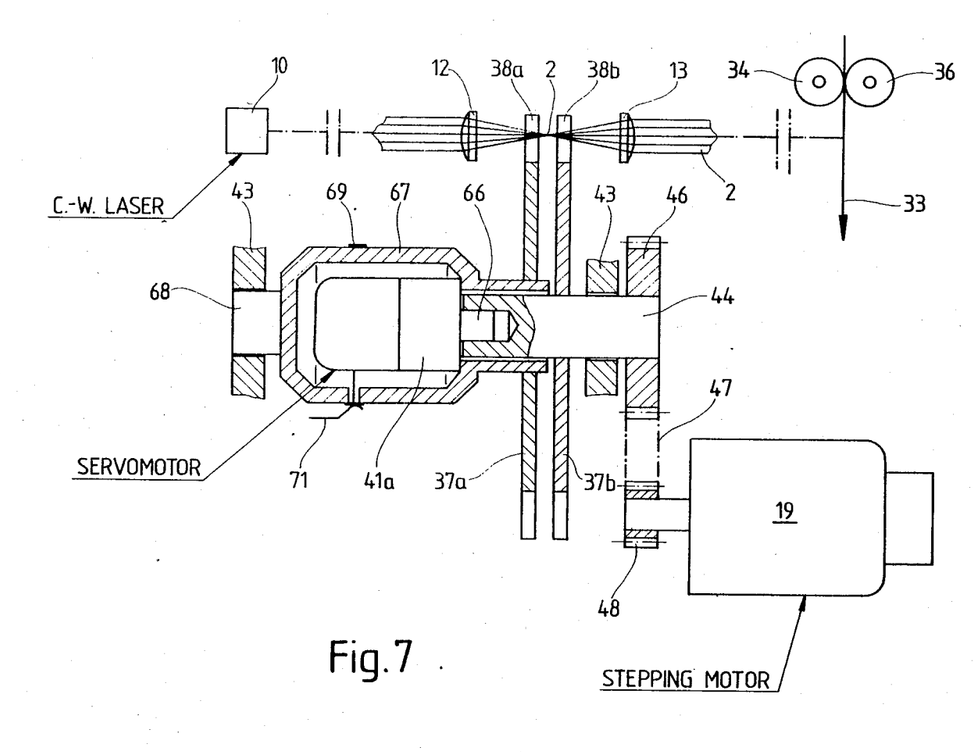
FIG. 7 is a schematic partly elevational and partly sectional view of an additional perforating apparatus.

FIG. 7 shows a further perforating apparatus wherein, in contrast to the apparatus of FIGS. 4 and 5, the shutters 37a and 37b are driven to rotate in the same direction. This apparatus comprises a servo-motor in the form of a gear motor 41a whose output shaft 66 is non-rotatably connected to the shaft 44. The gear motor 41a is fixedly installed in a housing 67 which is rotatable about the shaft 44. A stub 68 of the housing 67 is aligned with the shaft 44 and is rotatably mounted in the frame member 43. The shutter 37a is non-rotatably secured to the housing 67. The gear motor 41a comprises a self-locking transmission or constitutes a so-called braking motor so that it can transmit but does not generate torque. The periphery of the housing 67 carries slip rings 69 for the gear motor 41a and the latter is connected with a control unit by means of wipers 71. The control unit is or can be identical with the control unit of FIG. 4.

The mode of operation of the apparatus which is shown in FIG. 7 is analogous to that of the perforating apparatus of FIGS. 4 and 5 except that the shutters 37a and 37b rotate jointly and the adjustment of the shutter 37a relative to the shutter 37b is effected directly by the gear motor 41a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; and means for intermittently interrupting the impingement of the beam upon the wrapping material intermediate said source of coherent radiation and the wrapping material in said second path so that the wrapping material in said second path is subjected to intermittent perforating action of the beam of coherent radiation.

2. The apparatus of claim 1, further comprising means or adjusting said interrupting means so as to alter the intervals of impingement of coherent radiation upon the wrapping material.

3. The apparatus of claim 2, wherein said adjusting means includes at least one manually operated adjusting element.

4. The apparatus of claim 3, wherein said adjusting element includes a screw.

5. The apparatus of claim 2, wherein said adjusting means includes a motor.

6. The apparatus of claim 1, wherein said source includes a laser.

7. The apparatus of claim 6, wherein said laser is a continuous-wave laser.

8. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; means for intermittently obstructing the impingement of the beam upon the wrapping material so that the wrapping material in said second path is subjected to intermittent perforating action of the beam of coherent radiation; and means for adjusting said obstructing means so as to alter the intervals of impingement of coherent radiation upon the wrapping material, said obstructing means having at least one opening whose deffective size determines the duration of impingement of coherent radiation upon the wrapping material.

9. The apparatus of claim 8, wherein the effective size of said opening is variable by said adjusting means.

10. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; and means for intermittently obstructing the impingement of the beam upon the wrapping material so that the wrapping material is said second path is subjected to intermittent perforating action of the beam of coherent radiation, said obstructing means comprising at least one mobile shutter; and means for adjusting said obstructing means so as to alter the intervals of impingement of coherent radiation upon the wrapping material.

11. The apparatus of claim 8, wherein said shutter includes a rotary disc.

12. The apparatus of claim 11, wherein said disc has a plurality of openings.

13. The apparatus of claim 12, wherein said openings are provided in the periphery of said disc.

14. The apparatus of claim 12, wherein said adjusting means includes means for moving said disc linearly substantially at right angles to the axis of rotation of the disc, said openings being configured in such a way that their effective size in the region where they permit coherent radiation to pass therethrough varies in response to said linear adjustment of the disc.

15. The apparatus of claim 11, wherein the opening of said disc has a substantially triangular shape.

16. The apparatus of claim 11, wherein the opening of said disc has a substantially trapezoid shape.

17. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; means for intermittently obstructing the impingement of the beam upon the wrapping material so that the wrapping material in said second path is subjected to intermittent perforating action of the beam of coherent radiation, said obstructing means comprising a plurality of coaxial substantially disc-shaped shutters and means for rotating said shutters; and means for adjusting said obstructing means so as to alter the intervals of impingement of coherent radiation upon the wrapping material.

18. The apparatus of claim 17, wherein each of said shutters has at least one opening and said adjusting means is arranged to change the extent to which such openings register with each other.

19. The apparatus of claim 18, wherein each of said shutters has a plurality of openings and such openings can be brought to positions of exact register with one another.

20. The apparatus of claim 17, wherein said adjusting means includes means for changing the angular position of at least one of said shutters relative to the other of said shutters.

21. The apparatus of claim 20, wherein said adjusting means comprises a differential gearing.

22. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; means for intermittently obstructing the impingement of the beam upon the wrapping material so that the wrapping material in said second path is subjected to intermittent perforating action of the beam of coherent radiation, said obstructing means comprising at least one rotary shutter and adjustable drive means for rotating said shutter; and means for adjusting said obstructing means so as to alter the intervals of impingement of coherent radiation upon the wrapping material.

23. The apparatus of claim 22, wherein said drive means comprises a stepping motor and further comprising means for adjusting said stepping motor as a function of the speed of movement of the wrapping material under the action of said moving means.

24. The apparatus of claim 23, wherein said moving means comprises means for moving a continuous web of wrapping material along said second path.

25. The apparatus of claim 23, wherein said moving means comprises means for rotating a succession of tubular bodies of wrapping material about their respective axes while such bodies are acted upon by coherent radiation.

26. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; means for intermittently obstructing the impingement of the beam upon the wrapping material so that the wrapping material in said second path is subjected to intermittent perforating action of the beam of coherent radiation; means for adjusting said obstructing means so as to alter the intervals of impingement of coherent radiation upon the wrapping material, said adjusting means comprising an adjustable motor; and means for adjusting said motor including means for monitoring the permeability of the wrapping material and for adjusting said motor when the permeability of wrapping material deviates from a predetermined value.

27. Apparatus for perforating the wrapping material for rod-shaped articles of the tobacco processing industry so as to provide such material with zones of selected air permeability, comprising a source of coherent radiation arranged to direct at least one beam of such radiation along a predetermined path; means for moving the wrapping material along a second path which intersects said predetermined path; means for intermittently obstructing the impingement of the beam upon the wrapping material so that the wrapping material in said second path is subjected to intermittent perforating action of the beam of coherent radiation, said obstructing means comprising at least one rotary shutter; and means for adjusting said obstructing means so as to alter the intervals of impingement of coherent radiation upon the wrapping material, said adjusting means including means for rotating said shutter at a first angular velocity while the shutter permits coherent radiation to reach the wrapping material and at a different second angular velocity during those intervals when the shutter prevents coherent radiation from impinging upon the wrapping material in the second path.

* * * * *